2,816,005
Patented Dec. 10, 1957

2,816,005
EXTRACTION OF URANYL NITRATE FROM AQUEOUS SOLUTIONS

Nathaniel Howell Furman, Princeton, and Roy J. Mundy, Perth Amboy, N. J., assignors to the United States of America as represented by the United States Atomic Energy Commission No Drawing. Application June 14, 1948,
Serial No. 32,994

17 Claims. (Cl. 23—14.5)

This invention relates to compounds of uranium and more particularly it relates to a method of extracting uranyl nitrate from an aqueous solution containing the same.

Heretofore the purification of uranium and compounds thereof has been a difficult and expensive process. One method of accomplishing such a purification was to prepare an aqueous solution of uranyl nitrate and thereafter to extract the uranyl nitrate from the aqueous solution with diethyl ether. The distribution of uranyl nitrate between the ether and water layers is such that large volumes of the relatively expensive ether are required in order to recover the major portion of the uranyl nitrate even from saturated solution of the uranyl nitrate. Moreover, as the uranyl nitrate is extracted from the aqueous phase, the extraction efficiency is reduced still further until at a relatively high concentration a point is reached at which no appreciable quantities are removed from the aqueous layer.

The present invention provides an extremely efficient and economical process for recovering substantially all of the uranyl nitrate present in an aqueous solution thereof. This process reduces materially the cost of extremely pure uranium and uranium compounds and makes possible large scale production thereof. Hence, the use of uranium-containing materials in ceramics and in metallurgical processes will be greatly benefited. Similarly, in the more recent use of uranium metal and compounds thereof in various processes leading to the development of nuclear energy where materials of an extremely high degree of purity are required, the present process finds wide application.

Accordingly, it is an object of the present invention to provide an improved method of extracting uranyl nitrate from aqueous solutions thereof.

It is another object of the invention to improve the efficiency of extraction methods for uranyl nitrate from aqueous solutions.

It is a further object of the invention to improve the economy and efficiency of the ether extraction of uranyl nitrate from aqueous solutions thereof.

Other objects will become apparent in the following description.

The present invention accomplishes the foregoing objects through the addition of at least one soluble nitrate salt to the aqueous solution of uranyl nitrate under such conditions that the product of the total nitrate ion normality of the solution and the distribution coefficient exceeds a value of 20 and thereafter extracting the uranyl nitrate from the solution with a selective organic solvent which is substantially immiscible with the uranyl nitrate solution. The distribution coefficient is defined as the ratio of the concentration of uranyl nitrate in an organic solvent to the concentration in an aqueous solution at equilibrium with the organic solution.

The soluble nitrate salts that have been found most useful in this process are the nitrates of lithium, calcium, zinc, bivalent copper and trivalent iron. Sodium nitrate similarly has been used to some extent chiefly because of its cheapness. However, sodium nitrate is somewhat less satisfactory than the aforementioned nitrate salts since the distribution coefficient of uranyl nitrate between diethyl ether and an aqueous solution of uranyl nitrate containing even large concentrations of sodium nitrate is relatively low when compared with the distribution coefficients obtained in the presence of the other nitrate salts. For the most part, the metal nitrate salts useful in attaining the objectives of the present invention are those which form well defined hydrates.

The principal selective organic solvent that has been used in accordance with the present method is diethyl ether although other immiscible solvents or mixtures of solvents may be used effectively provided they are solvents for uranyl nitrate.

In addition to the presence of the nitrate compounds which act as salting out agents it is preferable that the aqueous layer be slightly acid, that is, at a pH of 4 or less in order to attain complete extraction. The acidity of the solution is a relatively important factor since it prevents the hydrolysis of such salting out agents as ferric nitrate and in addition precludes the possibility of the formation of basic uranium salts.

It appears that there is no appreciable distribution of uranyl nitrate from an aqueous layer into the selective organic solvent layer until the total normality of the nitrate exceeds a value of about 2 or 3. The distribution increases rather rapidly after this point is reached especially in the presence of the nitrate ion and of the cations mentioned above which associate strongly with water. Thus, ferric, calcium, cupric, zinc or lithium nitrate added to aqueous uranyl nitrate until the concentration of the nitrate ion in solution reaches the value of about 7 or 8 normal will result in distribution coefficients between the organic and water layers of from 10 to 100 times those observed with about 7 to 8 normal nitrate solutions containing certain other nitrates such as ammonium nitrate.

In general, it is desirable that the present extraction process be carried out under such conditions that the product of the distribution coefficient and the total nitrate normality at equilibrium is at least 20. It has been found that exceptionally high values of this product, i. e., values of the order of 500 to 3000 can be obtained by using as a salting out agent a nitrate selected from the group consisting of ferric, calcium, cupric, zinc and lithium nitrates.

The examples following hereinafter are presented to illustrate the method of the present invention and it will be understood that the invention is not limited to the specific materials and conditions described therein.

Example 1

Calcium nitrate was added to a measured volume of 0.51 normal aqueous uranyl nitrate, increasing the total nitrate concentration to about 11.08 normal. This solution was shaken for about 15 minutes at 27.5° C. in a separatory funnel containing an approximately equal volume of diethyl ether so that an equilibrium distribution of uranyl nitrate was obtained between the aqueous and the ether phases. The uranium in the water layer was separated from the calcium by precipitation as ammonium diuranate, and the uranium was determined volumetrically with ceric sulphate. Uranium in the ether phase was estimated gravimetrically. The calcium concentration in the aqueous phase was determined by the standard oxalate precipitation followed by permanganate titration. The distribution coefficient of uranyl nitrate, that is, the concentration in the ether phase divided by the concentration of the uranyl nitrate in the aqueous phase, was 165.4, and the product of the distribution coefficient and the total nitrate normality was 1836.

More than 99% of the uranyl nitrate in the aqueous phase was extracted by the ether.

In most cases where it is desirable to extract substantially all the uranyl nitrate from the aqueous solution thereof into the ether, it is advantageous to use relatively high concentrations of the salting out agent, preferably a substantially saturated solution of the nitrate salt. The reason for this is that as the concentration of the salting out agent decreases its effect upon the distribution coefficient of the uranyl nitrate falls off rapidly as is shown in Table 1 where calcium nitrate was employed as the salting out agent.

Table 1

| Normality of $Ca(NO_3)_2$ | Initial Aqueous Phase Normality of $UO_2(NO_3)_2$ | Total Nitrate Normality | Distribution Coefficient | Product of Distribution Coefficient and Total Nitrate Normality at Equilibrium |
|---|---|---|---|---|
| 10.57 | 0.51 | 11.08 | 165.4 | 1,836 |
| 8.22 | 0.260 | 8.48 | 25.1 | 213 |
| 4.06 | 0.128 | 4.19 | 0.474 | 1.98 |
| 1.991 | 0.122 | 2.11 | 0.040 | 0.084 |

By following the procedure outlined in Example 1 with the exception that other nitrate salts at concentrations close to saturation were employed in the place of calcium nitrate, the results shown in Table 2 were obtained.

Table 2

| Ex. No. | Salting Agent | Normality of Agent | Initial Aqueous Phase Normality of $UO_2(NO_3)_2$ | Total Nitrate Normality | Distribution Coefficient | Product of Distribution Coefficient and Total Nitrate Normality at Equilibrium |
|---|---|---|---|---|---|---|
| 2 | $Zn(NO_3)_2$ | 10.68 | 0.259 | 10.94 | 257 | 2,810 |
| 3 | $Cu(NO_3)_2$ | 9.33 | 1.98 | 11.31 | 162.0 | 1,848 |
| 4 | $LiNO_3$ | 10.52 | 0.133 | 10.65 | 85.0 | 906 |
| 5 | $Fe(NO_3)_3$ | 7.43 | 0.040 | 7.47 | 87.5 | 654 |

From the foregoing examples it becomes apparent that it is highly advantageous to use calcium, zinc, copper, lithium or ferric nitrate as the salting out agent. The addition of nitrate ion in the form of ammonium nitrate does not increase the distribution coefficient of uranyl nitrate between ether and an aqueous solution thereof sufficiently to make their use in the present process commercially feasible. For example, when ammonium nitrate is substituted for calcium nitrate in the procedure set forth in Example 1, the product of distribution coefficient and total nitrate normality is only about 14. Nitric acid as a source of nitrate ions for the present purposes is not commercially feasible.

Mixtures of salts may also be used in order to increase the distribution coefficient of the uranyl nitrate. When such mixtures are used, each of the nitrate salts contributes its effect on the distribution coefficient independently of the others. The distribution coefficient obtained depends upon the proportion of the total nitrate ion concentration contributed by each salt and upon the distribution coefficient which would be obtained if each salt were present at a concentration equivalent to the total concentration of all the nitrate salts actually present.

In this process other organic solvents may be used for the extraction of uranyl nitrate such as isopropyl and benzyl ethers and ethyl acetate. Isopropyl and normal propyl alcohol, normally completely miscible with water, may also be used since they are immiscible with saturated solutions of nitrate salts. The butyl alcohols may be used in a manner similar to the propyl alcohols. Solvents such as ethyl and methyl alcohol and acetone may be mixed with a second solvent such as benzene or toluene and the mixtures used as extractants in accordance with the present invention. In general, it may be said, that the solvents most useful in carrying out the present invention are those in which not only the uranyl nitrate is soluble but also those in which water is slightly soluble since it is indicated that the uranyl nitrate exists in the organic phase in a hydrated state.

Many alternatives will be apparent to those skilled in the art.

Since many embodiments might be made of the present invention and since many changes might be made in the embodiment described, it is to be understood that the foregoing description is to be interpreted as illustrative only and not in a limiting sense.

We claim:

1. A method of extracting uranyl nitrate from an aqueous solution thereof which comprises dissolving in said solution calcium nitrate to increase the product of the total nitrate ion normality and the distribution coefficient to a value in excess of 20, and extracting uranyl nitrate from said solution with a selective organic solvent immiscible with said solution.

2. A method of extracting uranyl nitrate from an aqueous solution thereof which comprises dissolving in said solution ferric nitrate to increase the product of the total nitrate ion normality and the distribution coefficient to a value in excess of 20, and extracting uranyl nitrate from said solution with a selective organic solvent immiscible with said solution.

3. A method of extracting uranyl nitrate from an aqueous solution thereof which comprises dissolving in said solution cupric nitrate to increase the product of the total nitrate ion normality and the distribution coefficient to a value in excess of 20, and extracting uranyl nitrate from said solution with a selective organic solvent immiscible with said solution.

4. A method of extracting uranyl nitrate from an aqueous solution thereof which comprises dissolving in said solution calcium nitrate to increase the product of the total nitrate ion normality and the distribution coefficient to a value in excess of 20, and extracting uranyl nitrate from said solution with diethyl ether.

5. A method of extracting uranyl nitrate from an aqueous solution thereof which comprises dissolving in said solution cupric nitrate to increase the product of the total nitrate ion normality and the distribution coefficient to a value in excess of 20, and extracting uranyl nitrate from said solution with diethyl ether.

6. A method of extracting uranyl nitrate from an aqueous solution thereof which comprises dissolving in said solution ferric nitrate to increase the product of the total nitrate ion normality and the distribution coefficient to a value in excess of 20, and extracting uranyl nitrate from said solution with diethyl ether, said solution being maintained at a pH of less than 4.

7. A method of extracting uranyl nitrate from an aqueous solution thereof which comprises substantially saturating said solution with calcium nitrate to increase the product of the total nitrate ion normality and the distribution coefficient to a value in excess of 20, and extracting uranyl nitrate from said solution with a selective organic solvent immiscible with said solution.

8. A method of extracting uranyl nitrate from an aqueous solution thereof which comprises substantially saturating said solution with ferric nitrate to increase the product of the total nitrate ion normality and the distribution coefficient to a value in excess of 20, and extracting uranyl nitrate from said solution with a selective organic solvent immiscible with said solution.

9. A method of extracting uranyl nitrate from an aqueous solution thereof which comprises substantially saturating said solution with cupric nitrate to increase the product of the total nitrate ion normality and the distribution coefficient to a value in excess of 20, and extracting uranyl nitrate from said solution with a selective organic solvent immiscible with said solution, said solution being maintained at a pH of less than 4.

10. A method of extracting uranyl nitrate from an aqueous solution thereof which comprises substantially saturating said solution with calcium nitrate to increase the product of the total nitrate ion normality and the distribution coefficient to a value in excess of 20, and extracting uranyl nitrate from said solution with diethyl ether, said solution being maintained at a pH of less than 4.

11. A method of extracting uranyl nitrate from an aqueous solution thereof which comprises substantially saturating said solution with ferric nitrate to increase the product of the total nitrate ion normality and the distribution coefficient to a value in excess of 20, and extracting uranyl nitrate from said solution with diethyl ether.

12. A method of extracting uranyl nitrate from an aqueous solution thereof which comprises substantially saturating said solution with cupric nitrate to increase the product of the total nitrate ion normality and the distribution coefficient to a value in excess of 20, and extracting uranyl nitrate from said solution with diethyl ether.

13. A process of extracting uranyl nitrate from an aqueous solution thereof which comprises dissolving in said solution at least one metal nitrate selected from the group consisting of the nitrates of lithium, calcium, bivalent copper, zinc and trivalent iron, and extracting uranyl nitrate from said solution with a selective solvent immiscible with said solution.

14. A process of extracting uranyl nitrate from an aqueous solution thereof which comprises dissolving in said solution a metal nitrate selected from the group consisting of the nitrates of lithium, calcium, bivalent copper, zinc and trivalent iron, and extracting uranyl nitrate from said solution with an ether.

15. A process of extracting uranyl nitrate from an aqueous solution thereof which comprises dissolving in said solution a metal nitrate selected from the group consisting of the nitrates of lithium, calcium, bivalent copper, zinc and trivalent iron, and extracting uranyl nitrate from said solution with diethyl ether.

16. A process of extracting uranyl nitrate from an aqueous solution thereof which comprises substantially saturating said solution with a metal nitrate selected from the group consisting of the nitrates of lithium, calcium, bivalent copper, zinc and trivalent iron, and extracting uranyl nitrate from said solution with an ether.

17. A process of extracting uranyl nitrate from an aqueous solution thereof which comprises substantially saturating said solution with a metal nitrate selected from the group consisting of the nitrates of lithium, calcium, bivalent copper, zinc and trivalent iron, and extracting uranyl nitrate from said solution with a selective solvent immiscible with said solution, said solvent comprising an organic alcohol having less than 5 carbon atoms.

References Cited in the file of this patent
UNITED STATES PATENTS 2,227,833   Hixson et al. _____ Jan. 7, 1941

OTHER REFERENCES

Misciattelli, Gazzetta Chimica Italiana, vol. 66, pp. 833–838 (1930).